United States Patent [19]

Katsuyama et al.

[11] Patent Number: 4,565,718
[45] Date of Patent: Jan. 21, 1986

[54] PROCESS AND APPARATUS FOR COATING THE SURFACES OF CONTAINERS WITH A MATERIAL

[75] Inventors: Iwao Katsuyama, Moriyama; Aijiro Okuzumi, Hachiouji, both of Japan

[73] Assignee: Kyowa Denki Kagaku K.K., Tokyo, Japan

[21] Appl. No.: 685,218

[22] Filed: Dec. 26, 1984

Related U.S. Application Data

[63] Continuation of Ser. No. 551,853, Nov. 15, 1983, abandoned.

[51] Int. Cl.[4] ............................................. B05D 1/02
[52] U.S. Cl. .................................... 427/420; 427/346; 427/425; 118/315; 118/320; 118/DIG. 3; 118/DIG. 4
[58] Field of Search ...................... 427/425, 420, 346; 118/319, 320, 315, 56, DIG. 3, DIG. 4, DIG. 11; 15/104.4, 104.9; 134/79, 150, 153

[56] References Cited

U.S. PATENT DOCUMENTS 4,207,356  6/1980  Waugh ................................ 427/425

FOREIGN PATENT DOCUMENTS 0129175  10/1980  Japan .................................. 427/425

*Primary Examiner*—Shrive P. Beck
*Attorney, Agent, or Firm*—Brumbaugh, Graves, Donohue & Raymond

[57] ABSTRACT

Disclosed is a process and an apparatus for coating with a material a plurality of containers transported consecutively, in which after the completion of coating with the material flowing down of the uppermost container of the containers being transported vertically, the subsequent container becomes the new uppermost container which will be subject to next coating with the material.

3 Claims, 6 Drawing Figures

PROCESS AND APPARATUS FOR COATING THE SURFACES OF CONTAINERS WITH A MATERIAL

This application is a continuation of application of Ser. No. 551,853, filed on Nov. 15, 1983, now abandoned

BACKGROUND OF THE INVENTION

The present invention relates to a process and an apparatus for coating the surfaces of containers with a material.

Nowadays coating materials of, for example, plastics are often applied on the surfaces of containers, e.g. glass bottles for soft drinks, in order to strengthen the containers so that they can be used repeatedly without the risk of breakage. Such coating of containers has been conventionally conducted mainly either by spraying a coating material in a powdery state onto the container or by dripping the containers in a liquid medium containing a coating material. However, these methods are disadvantageous in that it is very difficult for them to control the thickness of coating layer.

As a way for overcoming such disadvantage, it has been proposed to apply a liquid coating on the surfaces of containers by means of nozzles. This method using nozzles makes it possible to obtain a relatively homogenous coating and also to carry out the coating for a number of containers continuously. More particularly, a plurality of containers can be successively applied on the surfaces thereof with a coating material by being successively transported into a coating zone and being applied with the material by means of the nozzles in the zone.

However, this method has the drawback that a sophisticated mechanism is needed for the action of the nozzles in the coating zone. For example, in the method most commonly employed, there is required a precise mechanism by which nozzles can move to exactly follow a container being transported horizontally in the coating zone and then move backward (i.e. in the direction opposite to the direction of the transportation of the containers) in order to commence the coating of a subsequent container (See Japanese Patent Application Publication No. 7091/1982). Thus, in addition to the need for a complex mechanism for controlling the movement of nozzles, the method suffers from a further disadvantage that, as the nozzles are being moved backward, some of the liquid coating material will drip from the nozzles without being applied onto containers. For avoiding the loss of the liquid coating material by the dripping during the backward movement of the nozzles, there has been proposed a means for temporarily stopping the supply of the liquid coating material and sucking back the material, at the time when each nozzle has finished applying the coating onto a given container (Japanese Patent Application Public Disclosure No. 139858/1980). However, such an approach is not preferable from the operational standpoint in that the supplying means for the liquid coating material has to be forced to function against its intrinsic action. In addition, in spite of the attempt to suspend the supply of the liquid coating material by the above-mentioned means, it is impossible to completely prevent the dripping of the material. Problems also arise in that due to the temporary stopping of the supply of the material there occurs clogging of the nozzles with the material and further there is difficulty in producing a homogeneous coating on containers with the material when the supply of the material is re-started.

SUMMARY OF THE INVENTION

The principal object of the present invention is to overcome the above-mentioned drawbacks or problems and to provide a process and an apparatus by which the coating of containers can be accomplished easily and effectively.

The present inventors have found that in coating the surfaces of a plurality of containers being continuously transported with a liquid material there can be achieved an efficient coating by transporting the containers in the vertical direction, even without the provision of a complicated mechanism for the movement of the nozzles and/or means for temporarily stopping the supply to the nozzle of the material.

Thus, according to one aspect of the present invention there is provided a process for coating the surfaces of plural containers with a liquid material as the containers are continuously transported, which comprises moving said plural containers continuously in the vertical direction while rotating the containers about horizontal axes, causing said liquid material to flow down from just above the uppermost container of the plural containers being moved vertically so as to coat the surface of said uppermost container with said liquid material, and just when the coating of said uppermost container has been completed, making the subsequent container the new uppermost container of the containers being vertically moved so as to coat said new uppermost container with said liquid material.

Further, according to another aspect of the present invention there is provided an apparatus for coating a liquid material on the surfaces of the containers comprising means for moving the plural containers continuously in the vertical direction at predetermined intervals while rotating said containers about horizontal axes, nozzle means for causing a liquid material to flow downward, said nozzle means being located just above the uppermost container being moved vertically, and means for continuously supplying said liquid material to said nozzle means.

In the present invention, the uppermost container of the containers being continuously or consecutively transported in the vertical direction is coated with a liquid material flowing downward from a fixed location. Accordingly, there is no need for a mechanism for moving a nozzle or nozzles to follow a certain container to be coated as in the conventional process or in an apparatus where containers are transported in the horizontal direction. Further, according to the present invention, a liquid material is caused to flow downward continuously, i.e. without being temporarily stopped, so that the containers are coated in turn with the material. It is therefore possible to preclude the problems caused by discontinuing the supply of the material, such as the clogging of the nozzles with the material or the dripping of the material from the nozzles. The present invention has a further advantage that the continuous supplying of the coating material makes it possible to apply each container with the same amount of coating material. Thus, the layers produced on the containers can be made homogeneous and thin.

Other features and advantages of the present invention will be apparent from the following description with reference to the drawings.

DETAILED DESCRIPTION OF THE PREFERRED EMBODIMENTS

Figure 1:
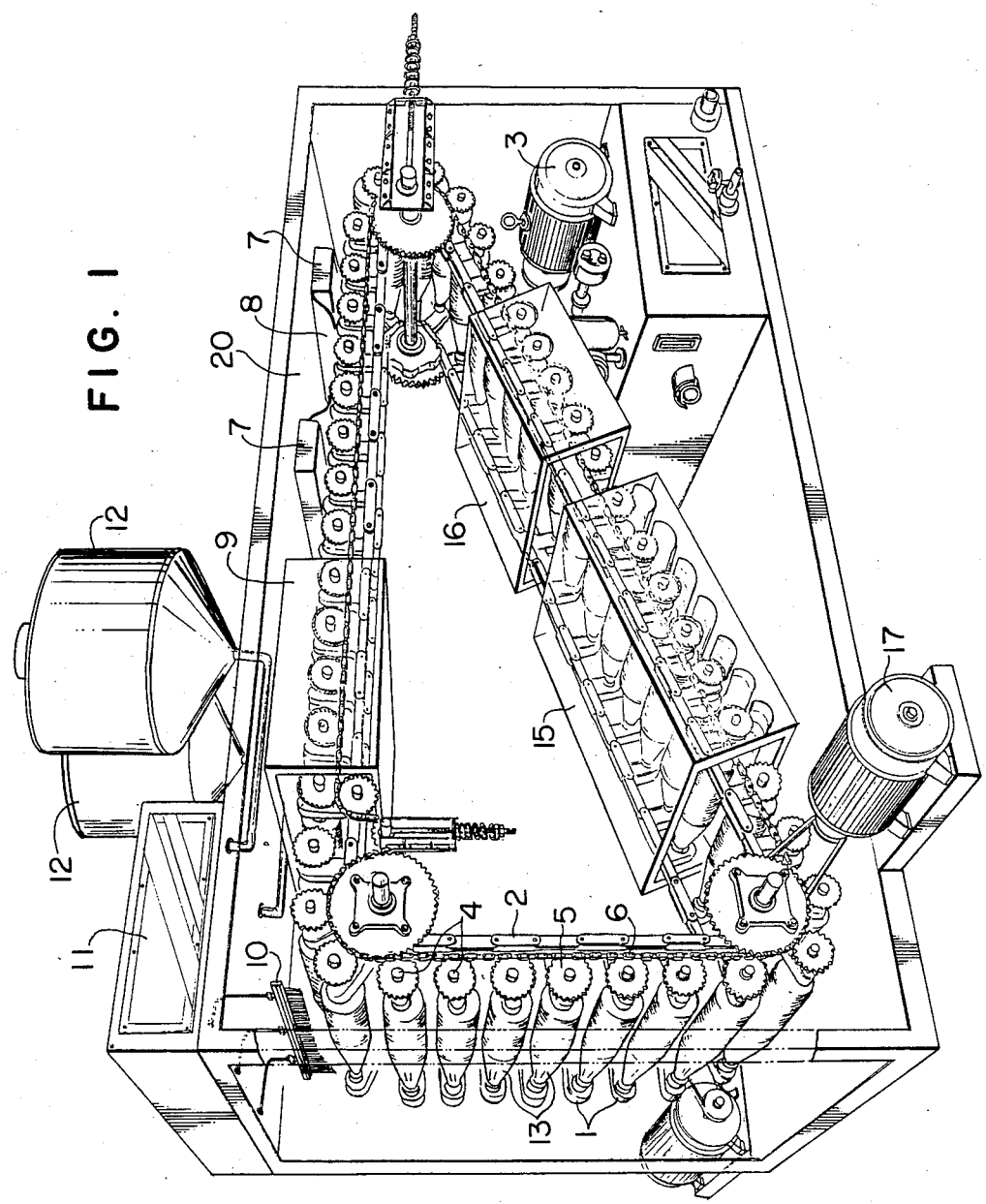
FIG. 1 is a perspective view of a typical coating plant in which the present invention can be practiced.

Containers or bottles to be coated are conveyed along a suitable line (not shown) and then transferred by a loading means (not shown) into a coating plant such as shown in FIG. 1. The plant includes a means for transporting a plurality of containers continuously at predetermined intervals while rotating the containers about horizontal axes. In the embodiment as shown in FIG. 1, the transporting means comprises a container-transporting mechanism and a container-rotating mechanism, in which the container-transporting mechanism includes a chain means 2 for transporting a plurality of holders 1 supporting containers 13 and a motor 3 for driving the chain means 2, while the container-rotating mechanism includes gears 5 each rotatably mounted onto a shaft 4 pressing a container 13 onto a holder 1, a chain means 6 engaged with the gears 5 for rotating the respective containers and a motor 17 for driving the chain means 6. The arrangement, however, is not limited to that illustrated and any other device may be used for transporting the containers. For example, as a container-rotating mechanism, there may be used wheels, which rotatably support the containers, and a belt means frictionally engaged with the wheels.

With the aid of a transporting means as mentioned above, the containers go firstly through a primer zone 20 while being rotated about their horizontal axes. In the primer zone the respective containers are applied with a priming agent, by any suitable means. In the embodiment as shown in FIG. 1, a cloth 8 is arranged to be wetted by capillary action with a priming agent stored in vessels 7 and to be contacted with the surfaces of the containers being transported so that the priming agent in the cloth is applied onto the surfaces of the containers. After the primer zone, the respective containers go through a preheating zone 9 so as to dry the priming agent.

The containers then one by one change their direction of travel from the horizontal direction to the vertical direction so that they are applied with a coating liquid material flowing downward continuously, according to the present invention. There is provided a nozzle means 10 just above the uppermost container being moved vertically. Thus, the liquid material flows downward onto said uppermost container so as to coat the surface thereof. The nozzle means generally includes a plurality of openings to which there is continuously supplied the liquid material by a coating material-supplying means 11 from tanks 12 for the material.

Figure 2:
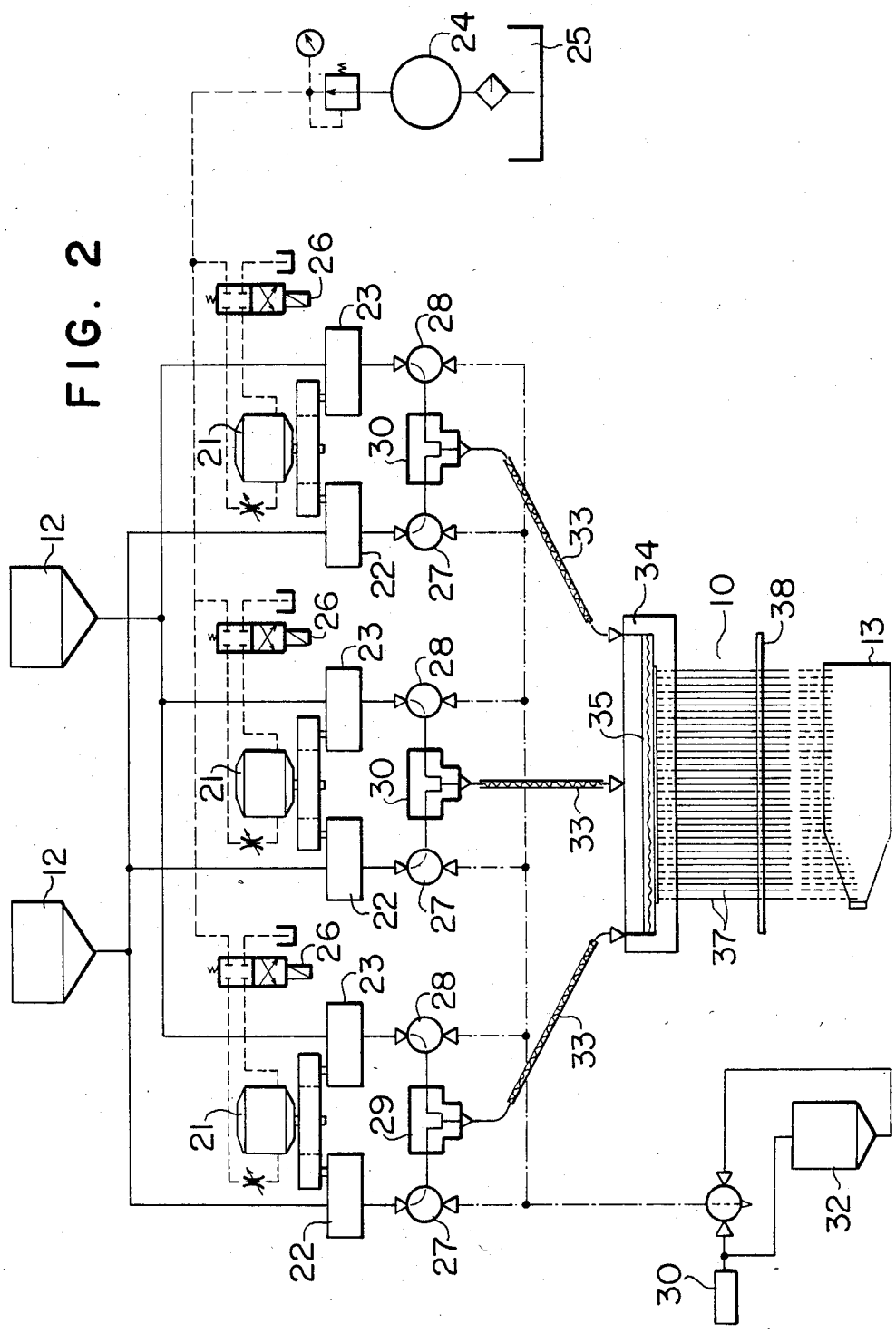
FIG. 2 is a diagram showing a nozzle means according to the present invention and the accompanying devices.

There is illustrated in FIG. 2 an embodiment of a nozzle means and a means for continuously supplying a liquid coating material to the nozzle means, suitable for use in the present invention. The liquid coating material is stored in a pair of tanks 12. One of the tanks is connected with a number of gear pumps 22 (three in the drawing) and the other tank is connected with a number of gear pumps 23 (also three). The gear pumps 22 and 23 are arranged in three pairs and each pair is operated by means of an oil-motor 21, through which oil from an oil-tank 25 is circulated by means of an oil-pump 24. The circulation of oil through each oil motor can be controlled by an associated solenoid valve 26. Thus, the liquid material pumped by the gear pump 22 and the liquid material pumped by the gear pump 23, via three-way valves 27 and 28 respectively, are mixed together in a mixing element 29 and then supplied to the nozzle means 10 through a mixing tube 33. When the coating plant is stopped, the nozzle means can be cleaned by switching the valves 27,28 so that a solvent in a tank 32 passes, with the aid of compressed air supplied by an air-compressor 30, through the nozzle means 10 via the mixing tubes 33.

Figure 3:
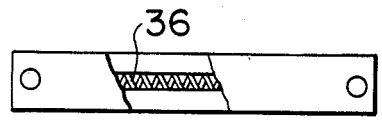
FIG. 3 is a partly broken plan view of the nozzle body of a nozzle means for use in the present invention.
Figure 4:
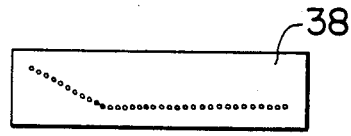
FIG. 4 is a plan view of the nozzle-supporting means of a nozzle means for use in the present invention.

In the lower portion of FIG. 2, the nozzle means 10 is shown in vertical cross-section. The nozzle means comprises a body 34 having a header 35 therein. There is provided a spiral member 36 in the header 35 so that the coating liquid material is homogenized (FIG. 3). At the bottom of the header 35 there are provided a plurality of openings and, to each of the openings there is connected a pipe means from which the liquid material is discharged. The pipes 37 are preferably supported by a plate 38. In a preferred embodiment according to the present invention, the plurality of openings (and hence, the plurality of pipes 37) are arranged so as to correspond to the contour of the container 13 (refer to FIG. 4), as will be explained in more detail later.

Figure 5A:
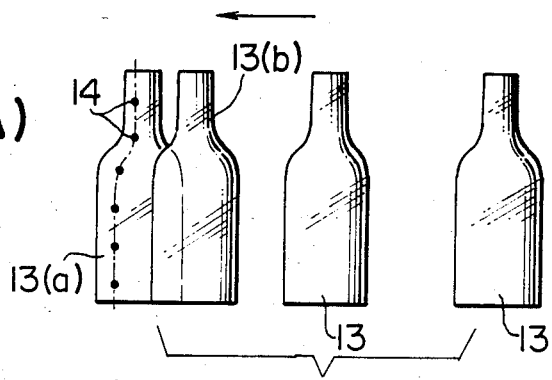
FIG. 5(A) is a plan view showing the locations of the nozzle means and the containers.
Figure 5B:
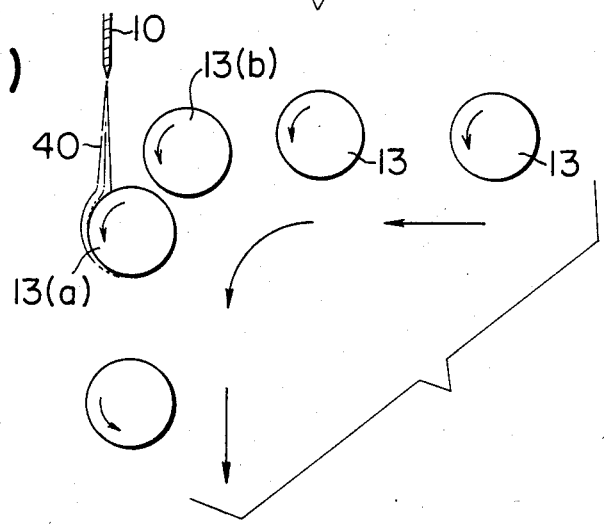
FIG. 5(B) is a vertical elevational view of the nozzle means and containers shown in FIG. 5(A).

In FIG. 5 there is illustrated the relationship between the location of the nozzle means and that of the containers to be subject to the coating operation according to the present invention. Each container 13 is first transported in the horizontal direction (from the right to the left in the drawing) and then in the vertical direction (downward in the drawing), while being rotated about its horizontal axis. The interval between the containers is so predetermined that, when the uppermost container being transported vertically (13(a) in FIG. 5) has rotated at least one time about its horizontal axis and the coating of this uppermost container with the liquid material 40 flowing down from the above has been completed, the subsequent container (13(b) in FIG. 5) becomes the new uppermost container of the containers being vertially transported. Here, the liquid material on the surface of an upper container will not fall down onto the surface of a lower container, since all the containers are rotated about their horizontal axes.

Containers in common use, glass bottles in particular, frequently have a curved contour in longitudinal cross section. In such a case, if the openings of the nozzle means are arranged along a straight line traverse to the direction of travel of the containers, there is a problem that, before completion of the coating of the uppermost container 13(a), a portion of the subsequent container 13(b) (more specifically, the wider portion of the container 13(b)) will interrupt some of the liquid material 40 to be applied on the container 13(a) so that the portion of the container 13(b) is undesirably coated in advance. For overcoming such problem, in a preferred embodiment according to the present invention, a nozzle means comprises a plurality of openings 14 and the plurality of openings are arranged so as to follow the contour of the container as shown in FIG. 5(A). In this way, it is always assured that the coating liquid material is caused to flow down continuously so that, only after the completion of the coating of the uppermost container, will the material coat the subsequent container which has now become the new uppermost container.

While the illustration is made with respect to a case where plural containers are first transported in the horizontal direction and then in the vertical direction downward, the present invention can of course be equally applied to a case where the containers are moved first in the vertical direction upward and then in the horizontal direction. In the embodiment as illustrated, the nozzle means is fixed so as to carry out coating of only one line of containers being continuously transported. However, it is also possible to make the nozzle means movable along a line transverse to the direction of travel of the containers. In this manner, two or more lines of containers can be coated alternately by moving the nozzle means.

The containers on which the coating has been completed in the above-mentioned manner are further transported through a zone 15 for drying and curing the coating material and further a cooling zone 16 and then transferred by unloading means (not shown) into a product-conveying line. However, it should be understood that the arrangement of the zones as illustrated is only for exemplification, and the alternation of the arrangement of these zones and/or addition of a further zone or zones may be made, if needed.

What is claimed is:

1. A process for coating surfaces of plural containers with a liquid material as the containers are continuously transported in spaced apart relation in a stream comprising moving said stream of containers continuously along a span in the vertical direction while rotating the containers about their horizontal axes, the containers having similarly contoured surfaces defining a particular contoured edge as viewed in a horizontal plane, flowing said liquid material downwardly from just above the uppermost container of the vertical span so as to coat the surface of the uppermost container adjacent the horizontal contoured edge from one end to the other with said liquid material along a line which in a horizontal plane corresponds generally to the particular horizontal contoured edge of the container to be coated, moving the stream of containers along a span which communicates with the uppermost container position in the vertical span, so that the liquid material will be directed on the exposed surface of the uppermost container in the vertical span even while an adjacent container in the stream is moving above and relative to the vertical span along the span which communicates with the uppermost container position, the arrangement being such that there is always a surface of a container presented below said line of flow of liquid material, and when the coating of said uppermost container has been completed, feeding a subsequent container to the uppermost position in the vertical span.

2. An apparatus for coating a liquid material on the surfaces of the containers comprising means for moving the containers continuously along a span in the vertical direction while rotating the containers about their horizontal axes, the containers having similarly contoured surfaces defining a particular contoured edge as viewed in a horizontal plane, means moving the stream of containers along another span which communicates with the uppermost container position in the vertical span, whereby a container moving along said other span leaves exposed beneath it a horizontal contoured edge of the container in the uppermost position of the vertical span, and nozzle means above the uppermost container in the vertical span and arranged along a line which in a horizontal plane extends adjacent the horizontal contoured edge from one end of the container to the other end thereof and corresponds generally to the particular horizontal contoured edge of the container that is exposed to the nozzle means when a container is moving along the span which communicates with the uppermost container position in the vertical span, so that the liquid material will be directed on the exposed surface of the uppermost container in the vertical span even while an adjacent container in the stream is moving above and relative to the vertical span.

3. The apparatus according to claim 2 wherein said nozzle means comprises a plurality of openings from which said liquid material is discharged, and said plurality of openings are arranged along said line in a horizontal plane so as to correspond generally to the horizontal contour of the container to be coated with the liquid material.

* * * * *